Jan. 3, 1939. S. G. RUSSELL 2,142,967
FISHING REEL
Filed Aug. 13, 1937
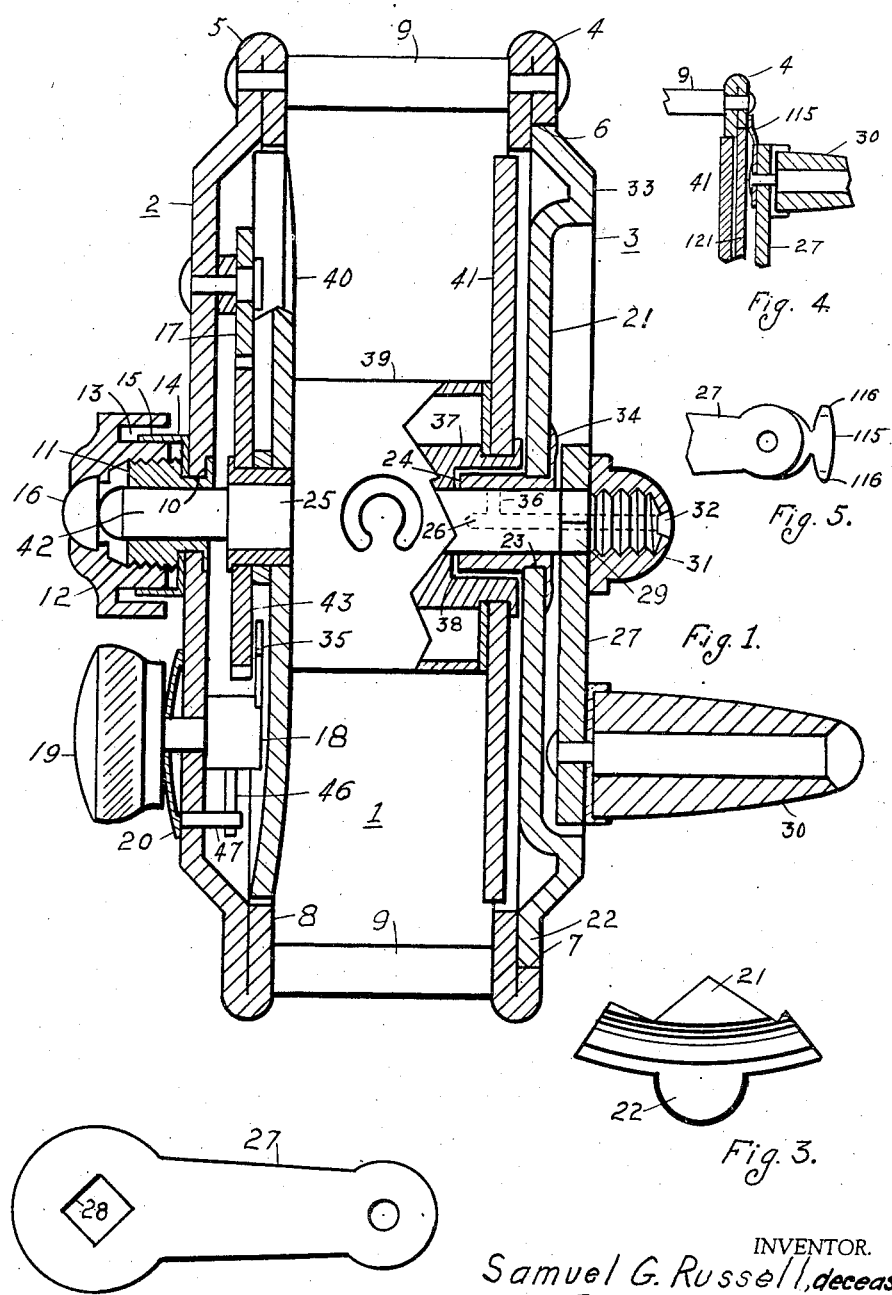
INVENTOR.
Samuel G. Russell, deceased
Jessie M. Russell, Executrix
BY Barnwell R. King,
HER ATTORNEY.

Patented Jan. 3, 1939

2,142,967

UNITED STATES PATENT OFFICE 2,142,967

FISHING REEL

Samuel G. Russell, deceased, late of Kalamazoo, Mich., by Jessie M. Russell, Kalamazoo, Mich., executrix, assignor to Shakespeare Company, a corporation of Michigan Application August 13, 1937, Serial No. 158,864

9 Claims. (Cl. 242—84.1)

This invention relates to fishing reels, and more particularly to fishing reels of the type disclosed in Patent 1,815,382, dated July 21, 1931.

The main objects of the invention are:

1st, to provide a fishing reel having improved means for supporting the spool within the frame so that bearing friction is reduced to a minimum even under the stress of use.

2nd, to provide improved bearing means in a fishing reel of this type which is subject to end thrust and twisting torque in use.

3rd, to provide a fishing reel consisting of a frame assembly unit and a spool assembly unit telescoped together and adapted to be readily taken apart for inspection and cleaning.

4th, to provide a fishing reel that is simple and economical in its parts and very efficient and effective for the purpose intended.

5th, to provide means in a fishing reel for preventing the line from getting under the crank when in use.

Objects relating to details and economies of my invention will appear from the description to follow. The invention is defined and pointed out in the claims.

A structure which is a preferred embodiment of my invention is illustrated in the accompanying drawing, in which:

Fig. 1 is a view partially in elevation and mainly in cross section of the fishing reel.

Fig. 2 is a view in side elevation of the crank arm.

Fig. 3 is a fragmentary view in side elevation of the bearing plate.

Fig. 4 is a fragmentary view in cross section of a modification of my reel.

Fig. 5 is a fragmentary view in side elevation of the crank arm of the modification.

Referring to the drawing, 1, in general, is a fishing reel comprising a frame assembly unit 2 and a spool assembly unit 3, the spool assembly unit being telescoped within the frame assembly unit and adapted to be longitudinally withdrawn therefrom in taking the reel apart for inspection and cleaning.

The frame assembly unit 2 preferably comprises an annular end member 4 and a dished end member 5. The annular end member 4 is folded inwardly upon itself to provide a recessed seat 6. At one point the axial portion of the seat 6 is cut away to form a small radially extending recess or groove 7 for receiving a lug 22, see Fig. 3, as will be later described. The dished end member 5 has a peripheral portion 8 folded inwardly upon itself. The folded portion of the end members are connected by transverse pillars or posts 9 to provide a rigid frame.

The dished end member is provided with a central opening 10 in which is secured a cylindrical bearing 11. A thrust bearing nut 12 is threaded on the outer end of the cylindrical bearing for longitudinal adjustment and has a cylindrical recess 13 facing the dished end member 2. The thrust bearing nut 12 is held in adjusted position by a ring 14 secured between the cylindrical bearing and dished end member, the ring having lateral arms 15 frictionally engaging the thrust bearing nut 12 in the recess 13.

Mounted in the thrust bearing nut 12 is a thrust bearing jewel 16. A pawl 17 is mounted in the dished end member 5. The spool assembly unit retaining means preferably comprises a cup 18 rotatably mounted in the end member 5 and having a control button 19 disposed on the outside of the end member, the cup and button being held in adjusted position by a friction spring washer 20 disposed between the end member and the button. The cup has a flange 35, and radial finger 46 adapted to coact with a stop 47.

The spool assembly unit preferably comprises a bearing plate 21 having a tongue 22, the spider being adapted to be disposed in the annular seat 6 when the tongue 22 is in registration with the groove 7. The plate is thus non-rotatably keyed to the annular end member 4 of the frame. The plate 21 is provided with a central opening 23 in which is secured a cylindrical bearing 24. Journalled in said bearing 24 is a spool shaft 25 having a central bore 26 opening to its outer end. A crank arm 27 has a substantially square opening 28 fitting a correspondingly shaped portion 29 of the shaft 25, there being a finger piece 30 pivoted to the outer end of the crank arm to provide means for rotating the spool. The crank is retained in place on the shaft by a cap 31 threaded to the outer end of the shaft and having a central conical hole 32. The bore 26 communicates with a radial hole 36 whereby the bearing 24 may be lubricated with oil as required.

The plate 21 is conformed to have a laterally projecting annular ridge 33 to prevent the line from fouling the crank arm.

Frictionally fitting the shaft 25 for rotation therewith is a spool core 37 having an internal recess 38 in one end for receiving the inner part of the bearing 24, so that the core is free to rotate relative to the bearing 24 and the plate 21. Longitudinal movement of the shaft relative to the bearing 24 is limited by the spool core 37 and the crank arm 27. Mounted on the core 37 is a spool 39 provided with a dished end flange 40 and a flat end flange 41. The dished end flange faces the dished end member 5 and the flat end flange 41 is adjacent the plate 21. That part of the bearing 24 on the outside of the plate 21 has a ridge 34 acting to keep the line from getting under the crank arm 27.

The inner end of the spool shaft 25 is provided with a portion 42 of reduced diameter for coaction with the cylinder bearing 11 and thrust bearing jewel 16. A ratchet 43 is secured to the core 37 for coaction with the pawl 17 in the space between the end member 5 and end flange 40. The pawl is preferably of the type which permits "click" rotation of the ratchet wheel in either direction. The flange 35 of the retaining means coacts with the inner face of the ratchet 43 to hold the spool assembly unit in place within the frame assembly unit.

When it is desired to withdraw the spool assembly unit 3 from the frame assembly unit 2, the control button 19 is given a quarter turn to move the flange 35 out of the path of the ratchet 43. Then the units may be readily taken apart for inspection and cleaning, and reassembled in the same manner.

The seat 6 and the bearings 11 and 16 coact to prevent the spool from being twisted within the frame in use, so that the spool flanges are prevented from rubbing against the end members of the frame. The reel is fool-proof and remarkably efficient and effective in operation.

Figs. 4 and 5 show a modification of the means for preventing the line from getting under the crank arm. The bearing plate or spider 121 is flush with the outer wall of the annular end member 4 to provide a smooth bearing surface for the sliding guard 115 secured to the inner side of the crank arm 27. The guard 115 is preferably of spring material and has slightly upturned flanges 116, 116 to prevent it from scratching the end member 4 and the bearing spider 121 in use. The guard 115 is very effective in keeping the line from getting under the crank arm.

The improvements have been illustrated and described in embodiments which have been found very satisfactory. No attempt has been made to illustrate and describe other embodiments or adaptations which are contemplated, as it is believed that this disclosure will enable those skilled in the art to embody or adapt the improvements as may be desired.

Having thus described the invention, which is claimed as new and is desired to secure by Letters Patent, is:

1. In a fishing reel, the combination of a frame assembly unit, and a spool assembly unit longitudinally telescoped within said frame assembly unit, said frame assembly unit comprising an annular end member having an annular seat provided with a groove, a dished end member having central cylindrical and thrust bearings, means connecting said end members to provide a rigid frame, a pawl mounted in said dished end member, and a manually operated spool assembly unit retainer pivoted to said dished end member, said spool assembly unit comprising a plate disposed in said seat and having a radial tongue fitting said groove and a central cylindrical bearing, a spool having a shaft journalled in said last named bearing for limited longitudinal movement, a crank secured to the outer end of said shaft, and a ratchet fixed to said shaft for coaction with said pawl and said retainer, the inner end of said shaft coacting with said thrust and cylindrical bearings of the frame assembly unit.

2. In a fishing reel, the combination of a frame assembly unit, and a spool assembly unit longitudinally telescoped within said frame assembly unit, said frame assembly unit comprising an annular end member, an end member having central cylindrical and thrust bearings, means connecting said end members to provide a rigid frame, and a manually operated spool assembly unit retainer, said spool assembly unit comprising a bearing plate keyed to said annular end member, a spool having a shaft journalled to said bearing plate for limited longitudinal movement, and a crank secured to the outer end of said shaft, the inner end of said shaft coacting with said thrust and cylindrical bearings of the frame assembly unit.

3. In a fishing reel, the combination of a frame assembly unit, and a spool assembly unit longitudinally telescoped therein, said frame assembly unit comprising a laterally facing seat, thrust and cylindrical bearings, and a manually operated retainer, said spool assembly unit comprising a bearing plate disposed in said seat, a spool having a shaft journalled to said plate for limited longitudinal movement, a crank secured to the said shaft, and a retaining element fixed to said shaft for coaction with said retainer to hold said units together, the inner end of said shaft coacting with said central thrust and cylindrical bearings, said units being free to be taken apart when said retainer is turned out of the way of said retaining element.

4. In a fishing reel, the combination of a frame assembly unit, and a spool assembly unit longitudinally telescoped therein, said frame assembly unit comprising an end member having a seat, an end member having central thrust and cylindrical bearings, posts connecting said end members in spaced relation, manually operated means associated with said frame assembly unit for holding said spool assembly unit in place, said spool assembly unit comprising a bearing plate disposed in said seat, and a spool having a shaft journalled to said plate for limited longitudinal movement, the inner end of said shaft coacting with said central thrust and cylindrical bearings, said units being free to be taken apart when said holding means is released.

5. In a fishing reel, the combination of a frame assembly unit, and a spool assembly unit longitudinally telescoped therein, said frame assembly unit comprising a laterally facing seat, and thrust and cylindrical bearings, said spool assembly unit comprising a bearing plate disposed in said seat, and a spool having a shaft journalled to said plate for limited longitudinal movement, the inner end of said shaft coacting with said central thrust and cylindrical bearings, and manually controlled means acting when closed to retain said units in connected relation.

6. In a fishing reel, the combination of a frame assembly unit comprising an end member having a laterally facing internal seat, and an end member having a central thrust bearing and a central cylindrical bearing opening in the same direction as said seat, and a pawl carried by said last named end member, a spool assembly unit comprising a bearing plate adapted to be disposed in said seat, a spool shaft journalled to said plate for limited longitudinal movement and adapted to coact at its inner end with said thrust and cylindrical bearings, a crank secured to the outer end of said shaft, and a ratchet fixed to said shaft for coaction with said pawl, and manually operated means mounted on said frame assembly unit for coaction with said ratchet to retain said units in assembled relation.

7. In a fishing reel, the combination of a frame assembly unit comprising a laterally facing seat, and a central thrust bearing and a central cylindrical bearing opening in the same direction as said seat, and a pawl, a spool assembly unit comprising a bearing plate adapted to be disposed in said seat, a spool shaft journalled to said plate for limited longitudinal movement and adapted to coact at its inner end with said thrust and cylindrical bearings, and a ratchet fixed to said shaft for coaction with said pawl, and means mounted on said frame assembly unit for coaction with said ratchet to retain said units in assembled relation.

8. In a fishing reel, the combination of two normally assembled units adapted to be longitudinally taken apart for inspection and cleaning, one of said units comprising a frame provided with a central cylindrical bearing and a thrust bearing, and the other of said units comprising a bearing plate, a spool shaft journalled to said plate, and a crank keyed to the outer end of said shaft, the inner end of said shaft coacting with said cylindrical and thrust bearings, said plate non-rotatably fitting said frame, and manually controlled means detachably connecting said units against longitudinal displacement.

9. In a fishing reel, the combination of an annular end member having a seat, a bearing spider removably fitting said seat, the outer wall of said spider being flush with the outer wall of said end member to provide an outwardly facing annular bearing surface, a crank arm journalled to said spider to turn adjacent said bearing surface, and a line guard secured to the inner side of said crank arm for sliding contact with said bearing surface, said line guard being of spring material and having slightly upturned flanges at the leading and lagging edges thereof.

JESSIE M. RUSSELL,
*Executrix of the Estate of Samuel G. Russell, Deceased.*